Oct. 7, 1958
H. F. TAPP ET AL
2,855,552
LOW SENSITIVITY SERVO-CONTROL SYSTEM
Filed May 17, 1957
2 Sheets-Sheet 1
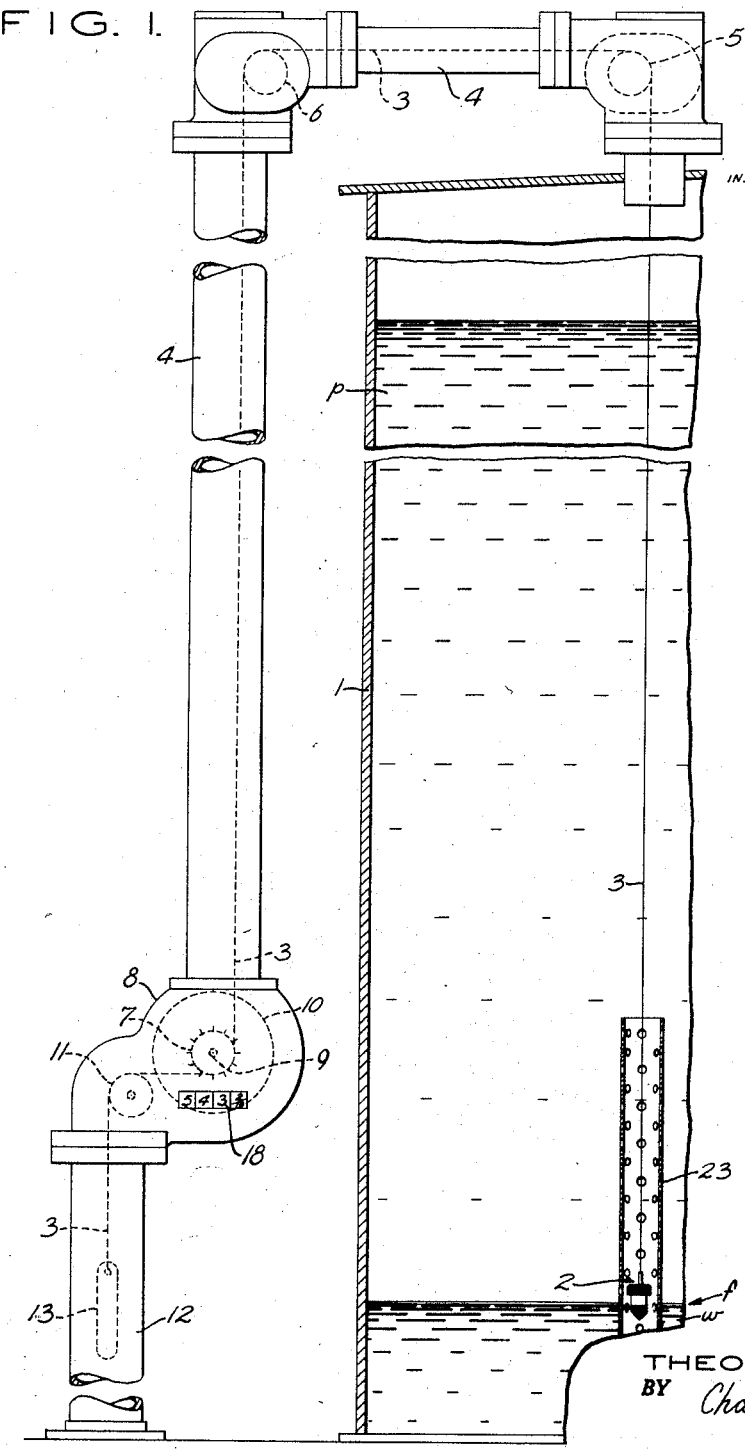
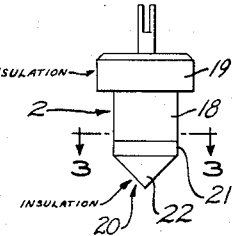
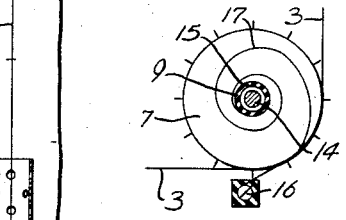
INVENTORS.
HARRY F. TAPP
THEODORE J. MESH
BY Chapin & Neal
ATTORNEYS

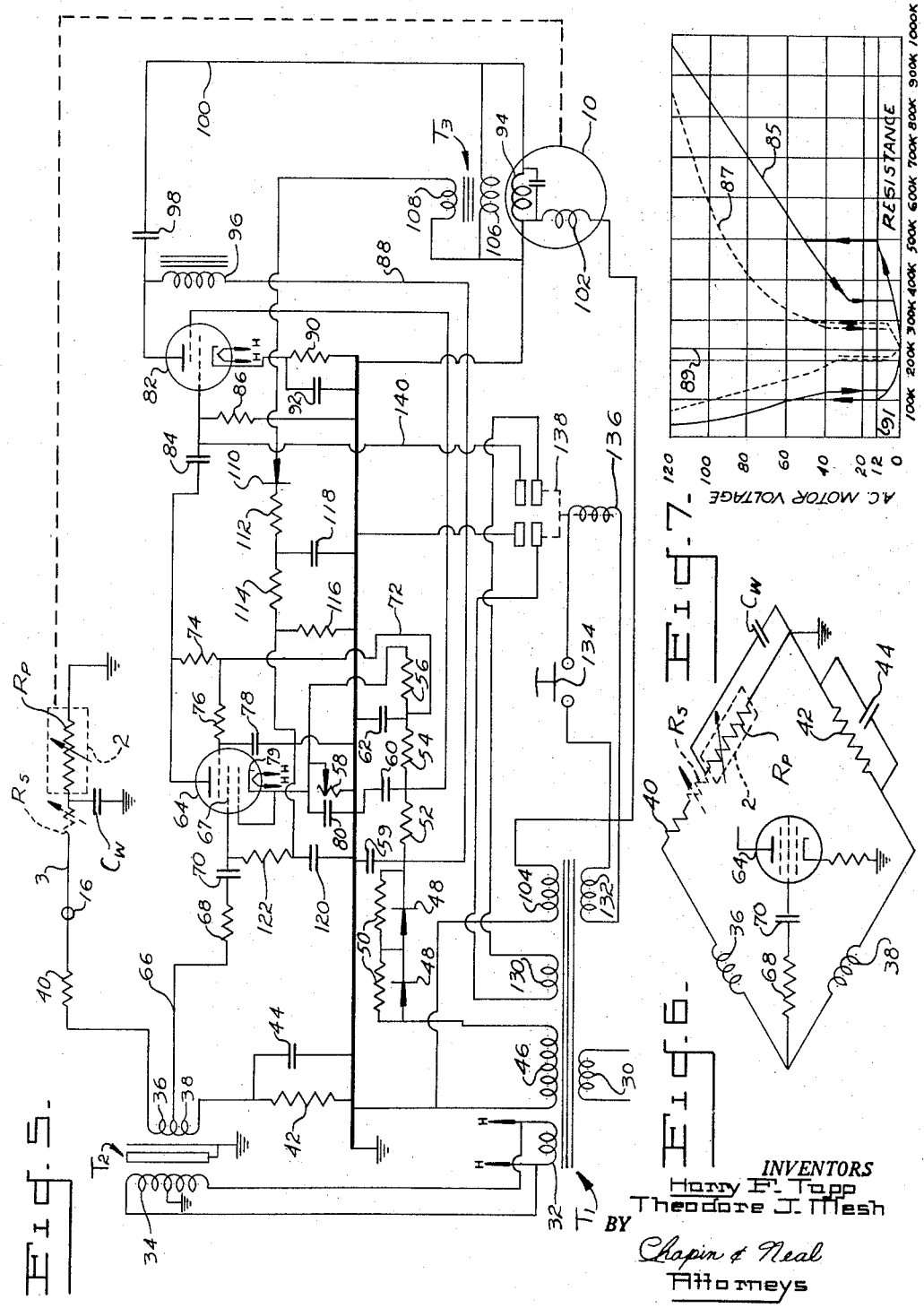

United States Patent Office

2,855,552
LOW SENSITIVITY SERVO-CONTROL SYSTEM

Harry F. Tapp, Longmeadow, and Theodore J. Mesh, Easthampton, Mass., assignors to Gilbert & Barker Manufacturing Company, West Springfield, Mass., a corporation of Massachusetts Application May 17, 1957, Serial No. 660,737

12 Claims. (Cl. 318—31)

The present invention relates to servo-control systems and more particularly to an improved electrical circuit for such control systems, which circuit, although not so limited, finds particular utility in the measurement of the height of water condensate in a storage tank for petroleum products.

The present application is a continuation-in-part of our copending application Serial No. 586,006, filed May 21, 1956, since abandoned.

As is well known, water condenses or is otherwise accumulated in oil tanks and other storage tanks for petroleum products. This means that one of the basic maintenance problems of such tanks is to remove the water before it reaches a level where it will be delivered with and contaminate the contents of the tank.

While draining such water at frequent intervals can be done, it is not very efficient and certainly is no guarantee against the delivery of water contaminated products. Floats and electrical probes for determining water height have also been found wanting due to scum and dirt which affect their accuracy and also, in the case of electrical probes, the safety hazard involved.

Another problem involved in measuring the water interface or the height of water in an oil tank is the ease with which wave motions are set up, as when oil is drawn from the tank. It is recognized that a servo-system having a probe which balances the system when disposed at the level of the interface will give an accurate measurement of said level. However, due to such repeated and relatively minor changes caused by this wave motion, conventional servo-systems are constantly in motion following these minor changes. Further the electrical resistance characteristics of the probe do not remain constant since the probe will be coated with oil (an insulator) and then the oil film will break down after being immersed in water. This causes continuing unbalancing of the servo-system and further maintains the servo-system in more or less constant motion. All of which makes the servo-system difficult to follow as well as shortening the life of its various components.

Thus one of the objects of the present invention is to provide a servo-system for disposing an electrical probe at the intersurface between oil and water to measure the height thereof, which system is insensitive to and will not respond to minor changes in the height of said interface.

In its broader aspects this object contemplates the provision of a servo-system which is insensitive to relatively minor changes in a condition being followed.

Another object is to provide an electrical servo-control system for use with petroleum products which system will not create a fire hazard under any conditions due to its use.

A further object is to provide a servo-control system, for height of water measurement, employing an electrical probe, said system being unaffected, for all practical purposes, by oil and scum which may form on the probe.

The above and other related objects and features of the invention will be apparent from a reading of the following description of the disclosure found in the accompanying drawings.

In the drawings,

Fig. 1 is a fragmentary, sectional-elevational view of a fluid storage tank and level-measuring means with which the invention may be used;

Fig. 2 is an elevational view, drawn to a larger scale, of the level-sensing element;

Fig. 3 is a sectional plan view taken on the line 3—3 of Fig. 2;

Fig. 4 is a fragmentary elevational view of the tape-driving wheel, showing the electrical connections between it and a stationary terminal;

Fig. 5 is an electrical diagram of the control apparatus of this invention;

Fig. 6 is a simplified diagram of the bridge circuit; and

Fig. 7 is a diagram illustrative of the relation between bridge unbalance and motor voltage.

Referring to these drawings; Fig. 1 shows a storage tank 1 adapted to contain two immiscible liquids $p$ and $w$, which are of different specific gravity and different electrical conductivity. These liquids $p$ and $w$ may, for example, be a fluid petroleum product and water, respectively. The interface between these liquids is designated $f$. The level-sensing element for the water consists of a probe 2, suspended in the tank by a perforated metallic tape 3, which also serves as an electrical conductor. This tape 3 passes out of the tank through a conduit 4, wherein are mounted idler-guide wheels 5 and 6, over which the tape is trained and guided to a driving sprocket or pin wheel 7. The driving wheel 7 is contained in a housing 8 and fixed to a shaft 9 which is driven by suitable speed-reduction gearing (not shown) from a two-phase alternating-current servo-motor 10 mounted on said housing. Also mounted in the latter is an idler guide wheel 11, which guides the tape into a conduit 12 supporting the housing 8 and containing a counterweight 13, fixed to the lower end of the tape. This weight is adequate to wind up the tape, since the maximum expected level of water is no more than a few feet. It is understood that the shafts of all the guide wheels 5, 6 and 11 and the shaft of the driving wheel 7 are mounted in bearings, which are suitably insulated from the described conduits and housing, as indicated diagrammatically in Fig. 4 in connection with the shaft 9 of driving wheel 7, that turns in bearings 14 insulated by sleeves 15. The shaft 9 is electrically connected to a suitable stationary insulated terminal 16 by means of the spiral conductor 17. The shaft 9 drives through suitable gearing (not shown) a suitable indicator 17' (herein shown as of the counter-wheel type) that is mounted in housing 18.

The probe 2 is constructed as shown in Figs. 2 and 3. It consists of a cylindrical member 18, of suitable electrical-conducting material (in this case stainless steel), and upper and lower members 19 and 20, respectively, of suitable insulating material, such for example as epoxy casting resin. The lower member 20 has a cylindrical part 21 which abuts member 18 and is of the same diameter and a conical part 22. The upper part 19 is cylindrical and of somewhat larger diameter than the member 18 for the purpose of keeping the latter from contacting the metal wall of a perforated pipe 23 (Fig. 1) in which the probe is or may be guided. The members 18, 19 and 20 may be held together in any suitable way. For example, the member 18 may have a series of longitudinal holes therethrough, which receive portions 24 of the insulating material during the process of casting the members 19 and 20. The conical tip 22 of the probe serves to push dirt and scum aside. Contact of the metal and water occurs as a well-defined ring around the external periphery of the cylindrical member 18. Thus, contact with the water is made at a definite level on the metal part of the probe and the contact area increases rapidly and uniformly as the probe is lowered rather than gradually at first and then at an increasing rate as would occur if a conical metallic tip were used.

The servo-control system, now to be described, maintains the probe 2 at the interface $f$, i. e. the height of the water $w$. The indicator 17' (driven through probe tape 3) is calibrated to reflect this height. It is thus a simple matter to check the indicator 17' periodically to determine when water should be drained from the bottom of the tank.

An exemplary electric circuit for this servo-control system is found in Fig. 5. In describing this circuit the values of the various components will be given in parentheses, it is to be understood that these values are merely illustrative and in no sense limiting except where corresponding limitations are found in the claims. It will also be appreciated that other equivalent electric circuits and components could be used to obtain the results herein described and claimed.

The circuit is powered by a suitable transformer $T_1$ having its primary winding 30 (120 v.) connected to a source of alternating current (not shown). One secondary 32 (6.3 v.) of this transformer is connected in a conventional manner to the heater elements H of the electronic tubes herein employed. The secondary 32 is also connected to the center tap primary 34 (6.3 v. either side of ground) of a shield transformer $T_2$.

The upper 36 (1.0 v.) and lower 38 (1.0 v.) halves of the secondary winding of transformer $T_2$ are incorporated in an A.-C. bridge which includes the probe 2 and is responsive to variations in the height of the oil water interface $f$ (Fig. 1). This bridge circuit is better seen in simplified form in Fig. 7. The upper arm of the bridge comprises the secondary winding 36, a fixed protective resistor 40 (30,000 ohms), the resistance $R_s$ of whatever scum which may form on the probe 2, the interface capacitance $C_w$ between the probe and the water and the resistance $R_p$ of the water to ground. It should be noted that for all practical purposes the oil or petroleum $p$ acts as a perfect insulator and does not provide a path for current from the metallic tape 3 to ground, thus only the resistance of the water is involved. The lower arm of the bridge includes the lower secondary 38 (which is 180° out of phase with the upper secondary 36), a fixed resistor 42 (220,000 ohms) and a capacitor 44 (.0025 mfd.).

The resistance 42 has been found, from experimentation, to balance out the described A.-C. bridge with the conducting portion of the probe 2 partly immersed in water and with sufficient reliability to permit calibration of the water height indicator 17'. It has also been found that the capacitor 44 balances out the probe interface capacitance $C_w$ to maintain the upper and lower arms of the bridge in phase opposition and thus permit complete null balance of same.

If the probe resistance $R_p$ increases, as by a drop in water level, an A.-C. signal will be developed across the bridge which signal is in phase registration with the secondary 38. If the probe resistance $R_p$ decreases, as by a rise in water level, an A.-C. signal will be developed across the bridge, which signal is in phase registration with the upper secondary 36.

Thus every variation in the condition being followed, i. e. the height of interface $f$, will be reflected by an unbalancing of the described A.-C. bridge and the phase relationship of the resulting A.-C. signal will indicate the direction of unbalance. This signal is amplified, as by the thermionic means now to be described, and coupled to the two-phase servo-motor 10 which returns the probe 2 to a bridge balancing position and at the same time moves the counter 17' to indicate the new water level.

Power for the thermionic amplifying means is provided from a secondary 46 (250 v.) of the transformer $T_1$. This A.-C. current is converted to provide a D.-C. power source by two silicon rectifiers or semi-conductors 48, each of which is shunted by a resistor 50 (100,000 ohms) as a protection against peak inverse voltage. The D.-C. current then passes through a filter or decoupling circuit back to ground. This filter circuit comprises series resistors 52 (10,000 ohms), 54 (10,000 ohms), 56 (40,000 ohms) and variable resistor 58 (10,000 ohms max.), also included are capacitors 59 (40 mfd.), 60 and 62 (both 20 mfd.).

Any signal developed across the above described A.-C. bridge is first amplified by variable gain means as by the variable mu pentode tube 64 (6BA6). Amplification is obtained in the present circuit in the following manner. The signal is fed to the tube 64 by input means comprising a line 66 extending between the secondaries 36, 38 and the control grid 67 of the pentode 64, said line including a protective resistor 68 (20,000 ohms), and a coupling capacitor 70 (.1 mfd.). The plate of pentode 64 is connected to the D.-C. source through line 72 (between resistors 54 and 56) and resistor 74 (100,000 ohms). The screen grid of pentode 64 is connected to line 72 through resistor 76 (470,000 ohms) and by-passed to ground by capacitor 78 (.1 mfd.). A conventional suppressor grid is provided for the pentode 64 and a positive voltage is imposed on its cathode 79 by reason of its being connected to ground through the variable resistor 58. This positive voltage is chiefly the result of bleeder current flowing from the positive power supply terminal through the resistor 58 and is substantially independent of the flow of current through the tube. In passing it can be noted that a cathode by-pass capacitor 80 (25 mfd.) is provided in conventional fashion. The positive voltage on the cathode 79 is adjusted to bias, in a fixed manner, the grid 67 to about minus 13 volts. When so biased the tube 64 operates on the lower end of its mu characteristic curve, that is any incremental change in grid bias results in only a minor or negligible change in amplification.

Thus a signal from the A.-C. bridge is amplified by the tube 64 and imposed in amplified form on its plate circuit. The amplified signal may be further amplified by a power tube 82 (5881) in the following manner. The amplified signal is fed from the plate of tube 64 to the grid of tube 82 through a coupling capacitor 84 (.1 mfd.) and returned to ground through a grid load resistor 86 (470,000 ohms). The plate of tube 82 is connected to the D.-C. voltage source through line 88. The cathode of tube 82 is connected to ground through biasing resistor 90 (500 ohms) which is by-passed by capacitor 92 (25 mfd.).

The further amplified signal is coupled to the starting coil 94 of servo-motor 10 by a choke 96 (in line 88) and a capacitor 98 (.5 mfd.) in line 100 leading to the motor coil 94. The other coil 102 of motor 10 is connected across a further secondary 104 (125 v.) of transformer $T_1$ in conventional fashion. The motor 10 will thus rotate at a direction dependent on the phase relationship of the signal from the A.-C. bridge and at a rate dependent on the strength of that signal to bring the probe 2 back to the interface $f$ and rebalance the bridge.

The motor coupling means are coupled through in a regenerative manner to the tube 64 as follows. A transformer $T_3$ is provided with one side of its primary 106 connected to the signal carrying line 100 and its other side connected to ground. The secondary 108 of transformer $T_3$ is connected at one side to ground with its other side connected to a one plate selenium rectifier 110 to provide a source of D.-C. voltage dependent on the strength of signal through line 100. The D.-C. voltage flowing beyond rectifier 110 is filtered to ground through resistors 112 (1000 ohms), 114 (3300 ohms), and 116 (15,000 ohms), and capacitors 118 (10 mfd.) and 120

(.1 mfd.). The positive D.-C. voltage thus obtained is impressed on grid 67 of tube 62 through resistor 122 (1 megohm). Positive voltage is thus applied to the grid 67, reducing the bias of the grid 67 and increasing the amplification of the tube 62.

From time to time it is desirable to raise the probe 2 in order to check its physical condition or, as a check on the system itself, to see if it will be rebalanced at the same level as before being raised. In order to accomplish this purpose, two further secondaries 130 (16 v.) and 132 (32 v.) are provided on the transformer $T_1$. A manually controlled set of contacts 134 is provided at some convenient location and arranged to complete a circuit through the secondary 132 and a relay coil 136. Energization of the coil 136 closes contacts 138 completing a circuit from the secondary 130 to a line 140. The line 140 connects with the grid of power tube 82 and, with the contacts 138 closed, an A.-C. signal is imposed on the motor coupling means which completely overrides any signal which might come from the A.-C. bridge. The polarity of the connections of secondary 130 are chosen so that upon manual depression of the contacts 134 the motor 10 will rotate to raise the probe 2. Upon opening of the contacts 134, the A.-C. bridge will be unbalanced and a signal generated to cause the probe 2 to return to the interface $f$.

*Summary*

Referring back to the previously described A.-C. bridge it will be seen that no posible hazard is involved in measuring the height of the interface $f$. This results in part from the low voltage (1 v.) flowing through the probe 2. Under a balanced condition of the bridge, this current is in the order of 5 microamps. Should, for any reason, the probe 2 become shorted to ground the protective resistance 40 (30,000 ohms) will limit current flow to the order of 33 microamps. As additional protection, should the grid 67 become shorted to the cathode of tube 62 and both the resistor 74 and capacitor 70 also become shorted out, the combination of resistances 40 and 68 will limit current flow to the order of 6 milliamps. Thus even such a remote possibility would create no hazard of explosion since actual tests have proven even the latter level of current to be safe.

It should also be noted that because such low currents are involved and the probe to ground water resistance is so high that the resistance of whatever scum may form on the probe has a negligible effect on the point at which the bridge will balance. The water probe contact resistance is in the order of 190,000 ohms while the maximum scum resistance is in the order of 2000 ohms. Thus whatever error might be introduced by scum resistance would be only about 1%.

As has been noted, the present servo-control system is insensitive to relatively small changes in the condition being followed, i. e. the height of the interface $f$. This end can be better appreciated from the following description of the operation of the circuit seen in Fig. 5.

When the A.-C. bridge becomes unbalanced a signal will be fed to the tube 62 and amplified a relatively small amount since a large negative grid bias is imposed by current flow through the variable resistor 58. This weakly amplified signal is fed to the grid of tube 82 and further amplified. The further amplified signal is coupled to the starting coil 94 of motor 10 through choke 96 and capacitor 98.

As has been mentioned there is a regenerative feedback circuit from the motor coupling to the grid of tube 62. This regenerative circuit is inoperative if the signal, as amplified by the tube 82, does not approximate the starting voltage of the motor 10, in this case 12 v. Thus a weak signal (less than 12 v.), say 10 v., will be reduced to 2 v. by the five to one step down transformer $T_3$. The two volts thus developed across the secondary coil 108 is insufficient to substantially overcome the high, low-voltage resistance of the semi-conductor selenium rectifier 110. This, in effect, is equivalent to the regenerative circuit being open when the voltage impressed across the motor coil 94 is less than the starting voltage of the motor. Even if some current does leak through the selenium rectifier 110 the decrease of negative grid bias will be so small that the increase on the lower end of the mu curve of tube 64 will not be sufficient to render the regenerative circuit operative. Thus a relatively small change in the height of the interface $f$ will not actuate the servomotor 10 and the A.-C. bridge will remain unbalanced so long as the voltage across the motor starting coil is less than about 12 v.

If the amplified signal voltage across the motor coil 94 is greater than about the starting voltage of 12 v. the voltage across secondary coil 108 (transformer $T_3$) is sufficient to overcome the low voltage resistance of the selenium rectifier 110. Accordingly a substantial positive voltage is applied to the grid 67 of tube 62 and the regenerative circuit is rendered operative. This causes the voltage across motor coil 94 to build up almost instantaneously and quickly bring the probe 2 to the new level of the interface $f$.

The improvement in operation of this circuit is shown graphically in Fig. 7 in comparison with an ordinary control, wherein the grid bias of the amplifier has a constant small value. The graph 85 shows how the voltage supplied to the servomotor 10 varies with variations in resistance of the probe circuit, where the regenerative circuit of the present invention is employed. The graph 87 shows how the voltage supplied to the servomotor varies with variations in resistance of the probe circuit, where only a constant bias, in this case —2 volts, is used. The ordinate 89 represents the resistance of the probe circuit (including resistor 40) at which the bridge balances. Those portions of the graph which lie to the left of ordinate 89 result from a rise in level of the water $w$, causing decrease in resistance because more water will contact with the probe. Those portions of the graph which lie to the right of ordinate 89 result from a drop in level of the water, causing increase in resistance because more of the petroleum product will contact with the probe. The abscissa 91 represents the voltage at which the motor 10 starts. It will be noted that in the case of both graphs there is a difference between the starting and stopping operations. Arrows on these graphs pointing upwardly or to the right indicate starting and arrows pointing downwardly or to the left indicate stopping operation of the motor.

Considering graph 87, it will be seen that a relatively small change in resistance will cause starting of the motor, for example, 25,000 ohms on rising water level and 55,000 ohms on falling water level and these changes are so small that the motor will repeatedly start and stop on very slight variations in the water level and thus operate in hunting fashion. The graph 85 shows that on rising water level a change in resistance of about 125,000 ohms is necessary to cause starting of the motor and that on falling water level a change in resistance of about 280,000 ohms is required for that purpose. On deceleration of the motor, stopping occurs with nearly the same changes in resistance as on starting in the case of graph 86, while much greater changes in resistance are required in the case of the graph 85, namely 110,000 ohms on rising water level and 120,000 ohms on falling water level. The horizontal distances between the ordinate 89 and the vertical portions of the graphs are a measure of sensitivity of the apparatus and it will be seen that such distances are much greater in the case of graph 85 than they are in the case of graph 87. Once the motor starts, then the effective grid bias rapidly changes, being rapidly reduced as the motor accelerates, and the rate of amplification thus increases rapidly as the tube 62 is brought into operation at the upper end of its mu curve. The important thing here is that the motor is not put into motion each time a small change occurs in the level of the interface f, thus avoiding the hunting action that would occur if operation like that shown by graph 87 were used. This enables the interface f to move with respect to the probe 2 when random disturbances occur, such as wave motions or drift of the probe, without causing operation of the motor, and yet to respond to any substantial change in level. The system disclosed has an accuracy of plus or minus $\frac{1}{16}$ inch of water level.

It will be understood that because of the gear ratio (1800 to 1 in this case) between the rotor of the motor and the sprocket wheel that drives the tape-carrying probe 2, over-shooting because of inertia of the rotor does not cause any difficulty here. A few revolutions of over-running of the rotor of the motor does not cause any appreciable movement of the tape driving sprocket wheel or the probe 2.

Having thus described our invention, what we claim as novel and desire to secure by Letters Patent of the United States is:

1. A servo-control system of low sensitivity, said system comprising an alternating current bridge, one arm of which includes a voltage source and a resistance variable in response to changes in a given condition, the other arm of said bridge including a voltage source 180° out of phase with the first voltage source and a fixed resistor, means for amplifying any signal developed across said bridge due to its being unbalanced, said amplifying means having a variable amplification factor, means for biasing said variable amplifying means to a point where its amplification factor is relatively small, means for coupling said amplified signal to a two-phase motor which is arranged upon actuation to restore said bridge to a balanced condition, said motor having a finite starting voltage, and regenerative means interconnecting said biasing means and said motor coupling means, said regenerative means being inoperative when the voltage in said motor coupling means is less than the approximate starting voltage of said motor.

2. A servo-control system as in claim 1 wherein the regenerative means include a semi-conductor which prevents any substantial flow of current through the regenerative means until the voltage in the motor coupling means approximates the starting voltage of said motor.

3. A servo-control system sensitive only to substantial changes in a given condition; said system comprising a normally balanced alternating current bridge, one arm of which includes a voltage source and a fixed resistance, the other arm of said bridge including a voltage source 180° out of phase with said first voltage source and a resistance variable in response to changes in said condition, a signal take-off intermediate said voltage sources, means for amplifying the signal, said amplifying means including a variable mu tube, means for biasing the control grid of said tube to the lower end of the mu characteristic curve of said tube, a motor for restoring said resistance to a bridge balancing condition, said motor having a finite minimum starting voltage, and regenerative means coupling said motor coupling means and said biasing means, said regenerative means including a semi-conductor which prevents flow of current through said regenerative means until the voltage in said motor coupling means approximates the starting voltage of the motor.

4. A servo-control system as in claim 3 wherein the signal amplifying means further include a second amplifying tube arranged to amplify the output of said variable mu tube and the motor is coupled to the output of said second amplifying tube by choke-capacitance means.

5. A servo-control system as in claim 4 wherein the regenerative means include a step down transformer, the primary of which is connected across the motor coupling means and the secondary of which is connected in series with said semi-conductor.

6. A liquid level indicator comprising a probe contacting said liquid, a normally balanced alternating current bridge circuit one arm of which includes a voltage source and the resistance between the probe and ground as represented by the liquid, the other arm of said bridge including a second voltage source 180° out of phase with said first voltage source, a resistor and a capacitor connected in parallel with said resistor, said capacitor having a value approximating the interface capacitance between the probe and the liquid, said bridge providing signal means for indicating an unbalanced position of said probe, and a two-phase motor actuated in response to said signal means for returning said probe to a balanced condition.

7. A servo-control system for measuring the height of the interface between two immiscible liquids having different electrical resistance, said system comprising a probe normally disposed at the level of said interface, an alternating current bridge, the upper arm of which includes a voltage source and the resistance between the probe and ground as represented by the liquid, the lower arm of said bridge including a voltage source of 180° out of phase with the first voltage source and a fixed resistance, means for amplifying a signal across said bridge due to its being unbalanced, said amplifying means comprising a variable mu tube, the grid of which is coupled to said bridge, means for biasing said grid to the lower end of the mu characteristic curve of said tube, a servo-motor for returning said probe to a bridge balancing position, means for coupling an amplified signal to said servo-motor and regenerative means including a semi-conductor interconnecting said motor coupling means and the grid of said variable mu tube.

8. A servo-control system as in claim 7 wherein manually actuated means are provided for imposing a signal on said servo-motor which overrides the bridge signal and raises the probe at will.

9. A servo-control system as in claim 7 wherein a fixed resistor is also included in the upper arm of said bridge, the value of said resistor being sufficient to prevent the flow of any hazardous current through said arm should the probe be directly shorted to ground.

10. A servo-control system as in claim 7 wherein the signal amplifying means further include a power amplifying tube arranged to amplify the output of said variable mu tube and the motor is coupled to the output of said power tube by choke capacitance means.

11. A servo-control system as in claim 10 wherein the regenerative means include a step down transformer, the primary of which is connected across the motor coupling means and the secondary of which is connected in series with said semi-conductor.

12. A servo-control system of low sensitivity, said system comprising an alternating current bridge, one arm of which includes a voltage source and a resistance variable in response to changes in a given condition, the other arm of said bridge including a voltage source 180° out of phase with the first voltage source and a fixed resistor, means for amplifying any signal developed across said bridge due to its being unbalanced, said amplifying means having a variable amplification factor, means for biasing said variable amplifying means to a point where its amplification factor is relatively small, means for coupling said amplified signal to a two-phase motor which is arranged upon actuation to restore said bridge to a balanced condition, said motor having a finite starting voltage, and regenerative means interconnecting said biasing means and said motor coupling means, said regenerative means being inoperative when the voltage in said motor coupling means is less than a predetermined value.

References Cited in the file of this patent

UNITED STATES PATENTS 2,664,531  Nakasone _____ Dec. 29, 1953